United States Patent [19]

Ohsawa et al.

[11] Patent Number: 5,499,074
[45] Date of Patent: Mar. 12, 1996

[54] AUTOFOCUS CAMERA

[75] Inventors: Keiji Ohsawa, Yokohama; Nobuo Matsukawa; Sunao Nishioka, both of Tokyo; Ryuichi Mori, Yokohama; Yoshiyuki Nakano, Tokyo, all of Japan

[73] Assignee: Nikon Corporation, Tokyo, Japan

[21] Appl. No.: 453,462

[22] Filed: May 30, 1995

Related U.S. Application Data

[63] Continuation of Ser. No. 357,092, Dec. 15, 1994, abandoned, which is a continuation of Ser. No. 185,167, Jan. 24, 1994, abandoned, which is a continuation of Ser. No. 786,606, Nov. 1, 1991, abandoned.

[30] Foreign Application Priority Data

Nov. 9, 1990 [JP] Japan .................................. 2-304693

[51] Int. Cl.$^6$ ................................................ G03B 13/36
[52] U.S. Cl. .......................................... 354/402; 354/408
[58] Field of Search ..................................... 354/402–409

[56] References Cited

U.S. PATENT DOCUMENTS 4,859,842  8/1989  Suda et al. ........................ 354/408 X
4,943,824  7/1990  Nabeshima et al. ............... 354/403 X
5,144,358  9/1992  Tsuni et al. ........................... 354/403

FOREIGN PATENT DOCUMENTS 62-95511  5/1987  Japan .
63-18314  1/1988  Japan .

Primary Examiner—Russell E. Adams
Attorney, Agent, or Firm—Shapiro and Shapiro

[57] ABSTRACT

An autofocus camera conducts a focus detection operation with one of differently directed sets of photoelectric conversion elements which is given priority according to the detected attitude of the camera. If focusing cannot be effected using the elements given priority, a focus detection operation is automatically conducted with the other elements. Also provided is a camera having a first mode of operation in which focusing detecting operations are conducted which collectively utilize outputs of all of the elements of differently directed sets of photoelectric conversion elements when a first camera attitude is detected, and a second mode of operation in which focusing detecting operations are conducted which collectively disregard the output of at least one conversion element when a second camera attitude is detected.

11 Claims, 5 Drawing Sheets

FIG. 4

| ATTITUDE OF CAMERA | MERCURY SWITCH | PHOTOGRAPHING IMAGE PLANE |
|---|---|---|
| (1) | SW1  SW2 | 60, 62, 61 |
| (2) | SW1  SW2 | 60, 61, 62 |
| (3) | SW2  SW1 | 60, 61, 62 |
| (4) | SW2  SW1 | 60, 62, 61 |

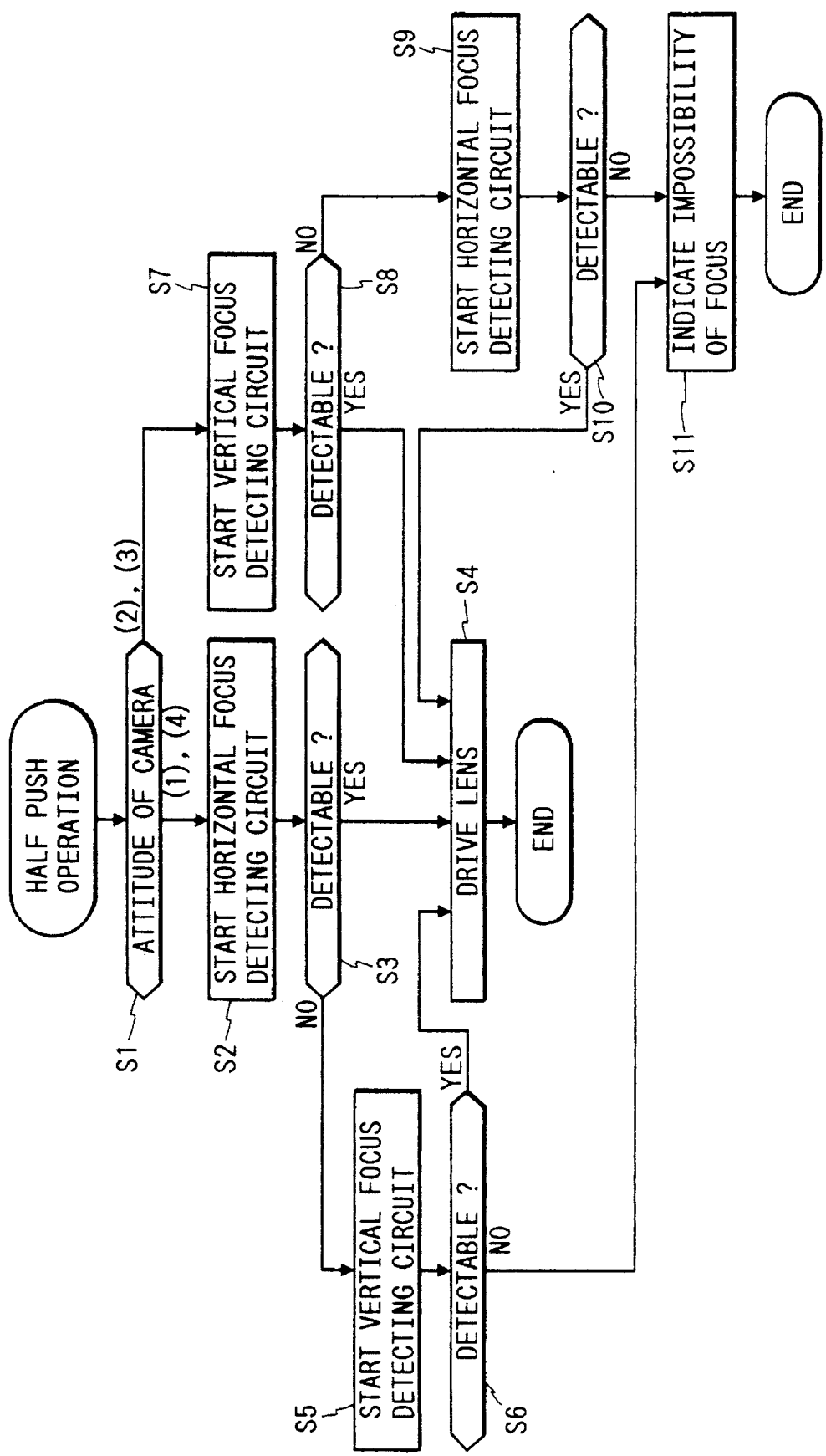

AUTOFOCUS CAMERA

This is a continuation of application Ser. No. 08/357,092 filed Dec. 15, 1994, which is a continuation of application Ser. No. 08/185,167 filed Jan. 24, 1994, which is a continuation of application Ser. No. 07/786,606 filed Nov. 1, 1991, all now abandoned.

BACKGROUND OF THE INVENTION

1. Field of the Invention

The present invention relates to an autofocus camera in which focus is detected by either horizontal or vertical photoelectric conversion elements which are given priority.

2. Related Background Art

A known example of such autofocus cameras is disclosed in Japanese Patent Application Laid-open No. 62-95511. This autofocus camera is described below with reference to FIG. 1.

In FIG. 1, the subject light passed through a photographic lens 1 is passed through a cross-shaped opening 2a of a field mask 2 disposed at art expected focal plane of the photographic lens 1 and then through a capacitor lens 3 and four re-projecting lenses 4 to reach an image sensor 5. Two horizontal line image sensors (photoelectric conversion elements) 5a, 5b which are extended in the horizontal direction of a camera, and two vertical line image sensors (photoelectric conversion elements) 5c, 5d which are extended in the vertical direction of the camera are disposed on the image sensor 5. The light passed through the horizontal portion of the field mask opening 2a is received by the line image sensors 5a, 5b through the corresponding reprojecting lenses 4, and the light passed through the vertical portion of the opening 2a is received by the line image sensors 5c, 5d through the corresponding reprojecting lenses 4.

The horizontal portion of the opening 2a corresponds to a horizontal detecting region 61 which is horizontally extended on the photographing image plane 60 shown in FIG. 2, and the vertical portion of the opening 2a corresponds to a vertical detecting region 62 which is vertically extended. Thus, the subject light from the horizontal detecting region 61 is received by the horizontal line image sensors 5a, 5b, and the subject light from the vertical detecting region 62 is received by the vertical line image sensors 5c, 5d.

Each of the line image sensors 5a, 5b, 5c, 5d photoelectrically converts the subject light and provides an input signal to a focus detecting circuit (not shown). The focus detecting circuit calculates defocusing amount and direction from the input signal in order to drive the photographic lens 1 to the focusing position. The photographic lens 1 is focused on the basis of the defocusing amount and direction.

The advantages of the above arrangement comprising the horizontal and vertical line image sensors are described below.

In such a focus detection system, when a subject is parallel with the direction in which two line image sensors, i.e., a detecting region in the photographing image plane, are extended, since the output of the two line image sensors is flat without contrast, the defocusing amount and direction cannot be calculated, and the focus cannot be thus detected. The line image sensors are thus disposed in both the horizontal and vertical directions so that priority is given to the line image sensors in one (for example, the horizontal direction) of the two directions for detecting focus on the basis of the output thereof, and when the focus cannot be detected, the focus is detected on the basis of the output from the line image sensors in the other direction (vertical direction). This permits the focus to be surely detected regardless of the direction in which the subject is extended.

In such conventional autofocus cameras, since the line image sensors given priority are fixed, the direction of the sensors given priority, i.e., the direction of the detecting region given priority, with respect to the subject when the camera is in the horizontal attitude is different from that in the vertical attitude. For example, when priority is given to the horizontal line image sensors (horizontal detecting region 61), the detecting region 61 given priority is extended in the horizontal direction of the subject when the camera is in the horizontal attitude, while the detecting region 61 is extended in the vertical direction of the subject when the camera is in the vertical attitude.

It will be appreciated, of course, that when focus cannot be detected by using the line image sensors given priority, the time for focusing becomes longer. Thus, when the direction of the detecting region given priority with respect to the subject changes with changes in the attitude of the camera, as described above, there is the problem that the time for focusing the photographic lens when the subject is in the vertical attitude is different from that when the same subject is in the horizontal attitude.

SUMMARY OF THE INVENTION

In accordance with a first of its principal aspects, the present invention provides an autofocus camera which conducts a focus detection operation with one of differently directed sets of photoelectric conversion elements which is given priority according to the detected attitude of the camera. If focusing cannot be effected using the elements given priority, a focus detection operation is automatically conducted with the other elements.

In accordance with another of its principal aspects, the invention provides an auto focus camera in which each of differently directed first and second photoelectric conversion means includes a plurality of light-receiving elements. The camera has a first mode of operation in which focus detecting operations are conducted which collectively utilize outputs of all of the light-receiving elements when a first camera attitude is detected, and a second mode of operation in which focus detecting operations are conducted which collectively disregard the output of at least one such element when a second camera attitude is detected.

The various features and advantages of the present invention will be more fully appreciated from the following description of the embodiments illustrated in the accompanying drawings.

Although the present invention is described with reference to embodiments shown in the drawings, the invention is not limited to these embodiments.

BRIEF DESCRIPTION OF THE DRAWINGS

FIGS. 3 to 5 show an embodiment of the present invention, in which FIG. 3 is a block diagram showing the control system of an autofocus camera according to the invention, FIG. 4 is a drawing showing the relation of the attitude of a camera to the state of a mercury switch and the direction of a photographing image plane, and FIG. 5 is a flow chart showing the processing procedure;

FIGS. 6 to 9 show another embodiment of the invention, in which:

FIG. 6 is a drawing showing the arrangement of line image sensors;

FIG. 7 is a drawing showing focus detecting regions on a photographing image plane;

FIG. 8 is a flow chart showing the processing procedure; and

FIG. 9 is a drawing showing focus detecting regions on a photographing image plane when a person is photographed by a camera in the vertical attitude.

DESCRIPTION OF THE PREFERRED EMBODIMENTS

Figure 1:
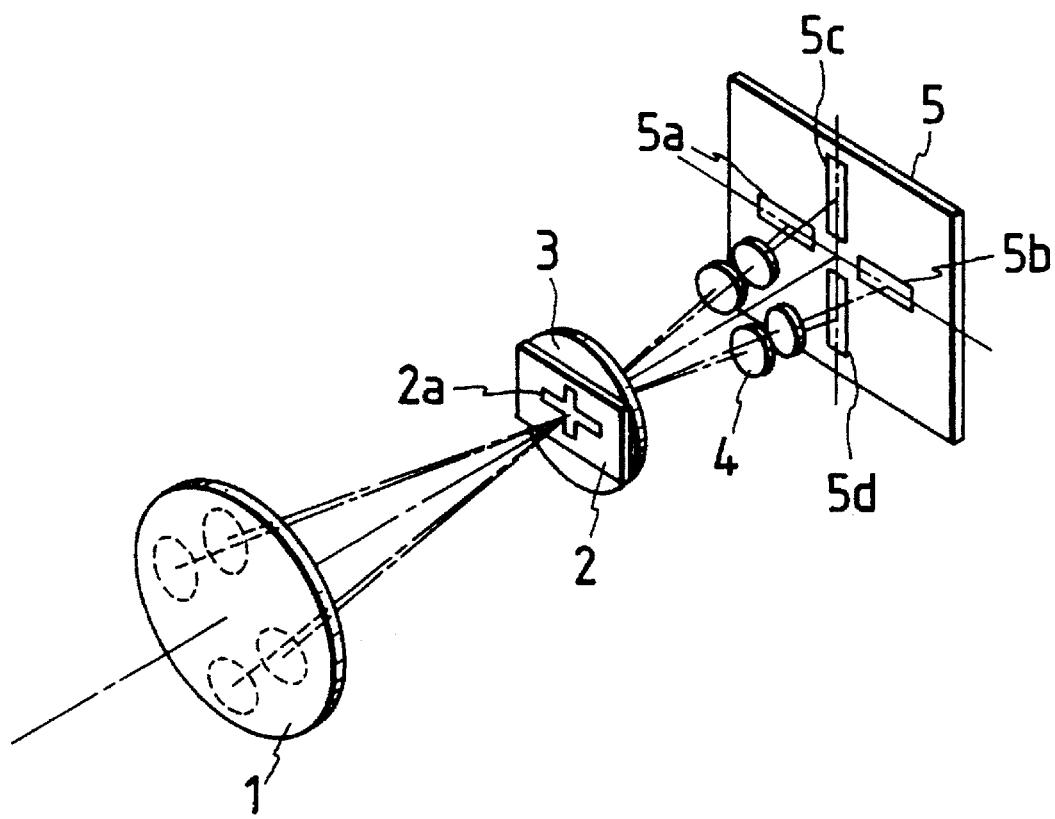
FIG. 1 is a perspective view showing a focus detecting optical system.
Figure 2:
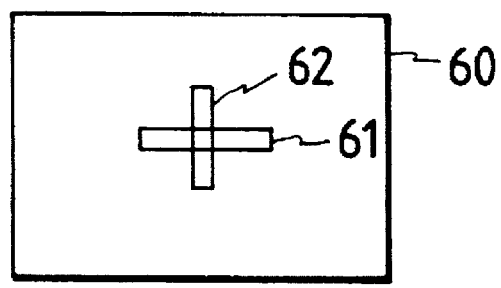
FIG. 2 is a drawing showing focus detecting regions.

An embodiment in which the present invention is applied to an autofocus camera having the focus detecting optical system shown in FIG. 1 is described below with reference to FIGS. 3 to 5.

Figure 3:
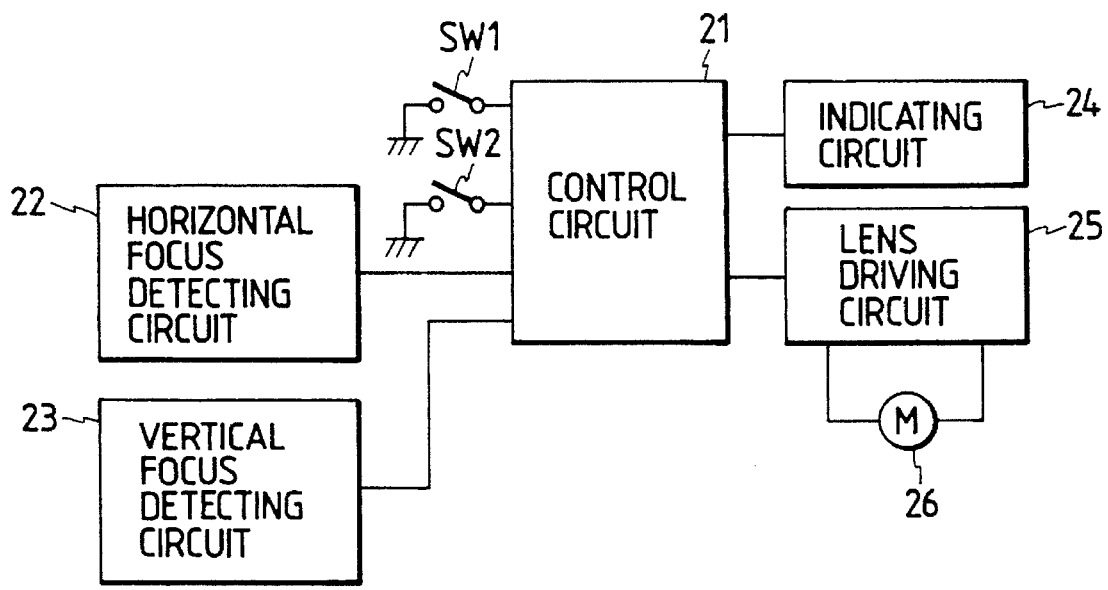

FIG. 3 is a block diagram showing the control system of an autofocus camera according to the present invention. A horizontal focus detecting circuit 22 and a vertical focus detecting circuit 23 are connected to a control circuit 21. The horizontal focus detecting circuit 22 performs a known focus detecting operation for calculating the defocusing amount and defocusing direction using the photoelectric conversion output from the horizontal line image sensors 5a, 5b shown in FIG. 1, both of which receives the subject light from the horizontal detecting regions 61 on the photographing image plane 60, so as to focus the photographing lens 1 on the subject. Similarly, the vertical focus detecting circuit 23 performs the focus detecting operation for calculating the defocusing amount and defocusing direction using the output from the vertical line image sensors 5c, 5d, both of which receive the subject light from the vertical detecting region 62 on the photographing image plane 60.

In this embodiment, the line image sensors corresponding to the focus detecting region extended in the horizontal direction of the subject are given priority for detecting the focus because the subject is generally frequently extended in the vertical direction rather than in the horizontal direction.

A indicating circuit 24, a lens driving circuit 25 and two mercury switches SW1, SW2 are also connected to the control circuit 21. A focusing motor 26 is connected to the lens driving circuit 25 so as to be driven in response to the command from the control circuit for focusing the photographing lens 1. The indicating circuit 24 indicates the impossibility of focusing by using a display (not shown) provided, for example, in a finder in response to the command from the control circuit 21.

The mercury switches SW1, SW2 are arranged substantially in the form of an inverted V when the camera is in the normal horizontal attitude (in which the upper side of the camera body faces upward), as shown by (1) in FIG. 4. The on/off state of each of the mercury switches SW1, SW2 is changed as the mercury is gravitationally moved according to the attitude of the camera, as shown in FIG. 4. Namely, when the camera is in the attitude (horizontal attitude) shown by (1) in FIG. 4, both switches SW1, SW2 are turned off, and when the camera is in the attitude (vertical attitude) shown by (2), the switch SW1 is turned on, while the switch SW2 is turned off. In the attitude (vertical attitude) shown by (3), the switch SW1 is turned off, while the switch SW2 is turned on. In the attitude (horizontal attitude) shown by (4), both switches SW1, SW2 are turned on.

The procedure of the focusing control by the control circuit 21 is described below on the basis of the flow chart shown in FIG. 5.

For example, when a release button (not shown) is half pushed, the program shown in FIG. 5 is started. In Step S1, the attitude of the camera is first detected from the states of the mercury switches SW1, SW2. If both switches SW1, SW2 are turned on or off, it is decided that the camera is in the horizontal attitude, i.e., the attitude shown by (1) or (4) in FIG. 4, and the flow moves to Step S2 in which the horizontal focus detecting circuit 22 is started. The horizontal focus detecting circuit 22 reads the output of the horizontal line image sensors 5a, 5b, determines the defocusing amount and defocusing direction of the photographic lens by a known focus detecting operation on the basis of the output of the horizontal line image sensors 5a, 5b and inputs the defocusing amount and direction to the control circuit 21. When the defocusing amount and defocusing direction cannot be calculated because horizontal contrast is absent in the subject, a signal indicating the impossibility of focusing is input to the control circuit 21.

In Step S3, the control circuit 21 makes a decision on the basis of the output from the horizontal focus detecting circuit 22 whether or not the focus can be detected. If it is decided that the focus can be detected, in Step S4, a lens driving signal corresponding to the defocusing amount and direction is output to the lens driving circuit 25 so as to drive the photographic lens 1 toward the focusing position by using the motor 26. On the other hand, if it is decided in Step S3 that the focus cannot be detected, the flow moves to Step S5 in which the vertical focus detecting circuit 23 is started.

The vertical focus detecting circuit 23 detects the focus on the basis of the output from the vertical line image sensors 5c, 5d and inputs the defocusing amount and direction or the signal indicating the impossibility of focusing to the control circuit 21 in the same way as that described above. In Step S6, the control circuit 21 makes a decision on the basis of the input signal whether or not the focus can be detected. If it is decided that the focus can be detected, the flow moves to Step S4, while if it is decided that the focus cannot be detected, the flow moves to Step S11. In Step S11, a display signal is sent to the indicating circuit 24 so that the impossibility of focusing is indicated by the display (not shown), On the other hand, in Step S1, if one of the two switches SW1, SW2 is turned on, and the other is turned off, it is decided that the camera is in the vertical attitude, i.e., the attitude shown by (2) or (3), and the flow moves to Step S7 in which the vertical focus detecting circuit 23 is started. In Step S8, a decision is made on the basis of the output from the vertical focus detecting circuit 23 whether or not the focus can be detected. If it is decided that the focus can be detected, in Step S4, the lens driving signal corresponding to the defocusing amount and direction, both of which are input from the vertical focus driving circuit 23, is output to the lens driving circuit 25 so as to drive the photographic lens 1 toward the focusing position by using the motor 26.

If it is decided in Step S8 that the focus cannot be detected, the flow moves to Step S9 in which the horizontal focus detecting circuit 22 is started. In Step S10, a decision is made on the basis of the signal from the horizontal focus detecting circuit 22 as to whether or not the focus can be detected. If it is decided that the focus can be detected, the flow moves to Step S4, while if it is decided that the focus cannot be detected, the flow moves to Step S11.

In detection of the focus according to the abovedescribed procedure, priority is given to the horizontal lime image sensors 5a, 5b when the camera is in the horizontal attitude, while priority is given to the vertical line image sensors 5c, 5d when the camera is in the vertical attitude. The shaded region in the photographing image plane 60 shown in FIG. 4 shows a detecting region corresponding to the line image sensors having priority. As shown in FIG. 4, the line image sensors given priority, i.e., the detecting region given priority, are constantly in the horizontal direction with respect to the subject regardless of the attitude of the camera. In the case of a vertical subject (ordinary case), the time required for focusing the photographic lens 1 can be minimized regardless of the attitude of the camera.

In this embodiment, the horizontal line image sensors 5a, 5b comprise horizontal photoelectric conversion elements, the vertical line image sensors 5c, 5d comprise vertical photoelectric conversion elements, the control circuit 21 and the horizontal and vertical focus detecting circuits 22, 23 comprise focus detecting devices, the lens driving circuit 25 and the motor 26 comprise lens driving devices and the mercury switches SW1, SW2 comprise attitude detecting devices, respectively.

FIGS. 6 to 9 show another embodiment of the invention.

Figure 6:
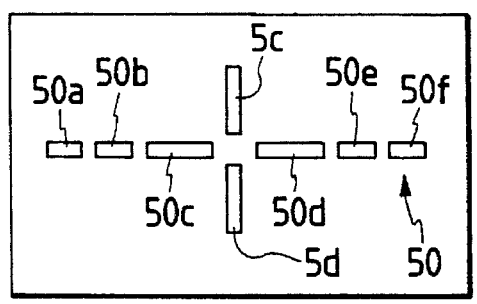
Figure 7:
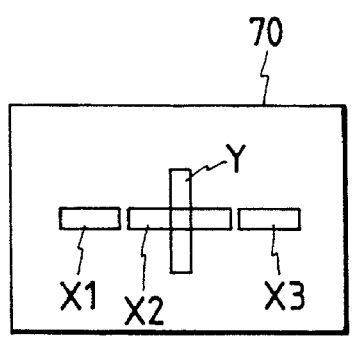

FIG. 6 shows the arrangement of line image sensors. As shown in the drawing, in this embodiment, a line image sensor 50 is divided into partial sensors 50a, 50b, 50c, 50d, 50e, 50f. The partial sensors 50a, 50b receive the subject light from the detecting region X1 in the photographing image plane 70 shown in FIG. 7. The partial sensors 50c, 50d receive the subject light from the detecting region X2, and the partial sensors 50e, 50f receive the subject light from the detecting region X3. The horizontal focus detecting circuit 22 calculates the defocusing amount and direction on the basis of the output from the partial sensors. The vertical focus detecting circuit 23 calculates the defocusing amount and direction on the basis of the output from the vertical line image sensors 5c, 5d, like the above-described embodiment.

Figure 8:
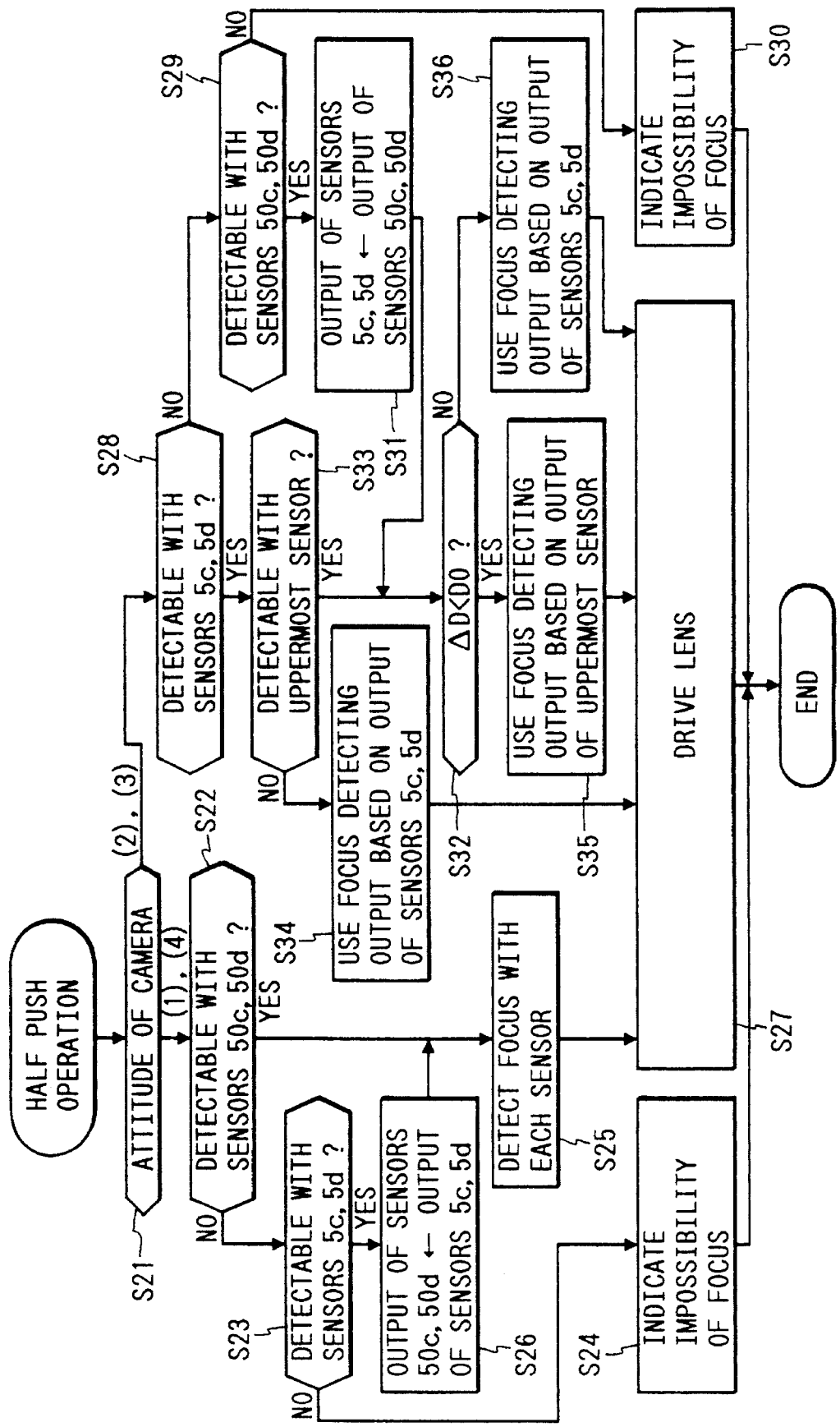

FIG. 8 shows a flow chart for focusing control in this embodiment.

In Step S21, the attitude of the camera is detected according to the states of the mercury switches SW1, SW2 in the same way as the first embodiment. If the camera is in the horizontal attitude (shown by (1) or (4) in FIG. 4), the horizontal focus detecting circuit 22 is started so as to determine the defocusing amount and direction on the basis of the output from the central partial sensors 50c, 50d (corresponding to the detecting region X2). Namely, the detecting circuit 22 detects the focus. In Step S22, a decision is made on the basis of the output from the partial sensors 50c, 50d as to whether or not the focus can be detected. If it is decided that the focus cannot be detected, the focus is detected on the basis of the output from the vertical line image sensors 5c, 5d (corresponding to the detecting region Y). If it is decided in Step S23 that the focus cannot be detected, the impossibility of focusing is indicated in Step S24 in the same way as that described above.

In the case of Yes in Step S22, the flow moves to Step S25. In the case of Yes in Step S23, the output from the image sensors 5c, 5d is handled as the output from the partial sensors 50c, 50d, and the flow moves to Step S25. In Step S25, the focus is detected on the basis of the output from the partial sensors 50a, 50b (corresponding to the detecting region X1), the partial sensors 50c, 50d (corresponding to the detecting region X2 or Y) and the partial sensors 50e, 50f (corresponding to the detecting region X3). The detection may be controlled by, for example, the method disclosed in Japanese Patent Application Laid-open No. 63-18314. The details of this control method are not described below because the method per se is not part of the present invention. The processing then goes to Step S27 in which the photographic lens 1 is focused on the basis of the results of focus detection performed in Step S25.

On the other hand, if it is decided in Step S21 that the camera is in the vertical attitude, i.e., the attitude shown by (2) or (3) in FIG. 4, the focus is detected on the basis of the output from the vertical line image sensors 5c, 5d. If it is decided in Step S28 that the focus cannot be detected, the focus is detected on the basis of the output from the partial sensors 50c, 50d, and the flow moves to Step S29. If it is decided in Step S29 that the focus cannot be detected, the impossibility of focusing is indicated in Step S30, and the processing is finished. If it is decided in Step S29 that the focus can be detected, the output from the partial sensors 50c, 50d is handled as the output from the vertical line image sensors 5c, 5d in Step S31, and the flow then moves to Step S32.

If it is decided in Step S28 that the focus can be detected, a decision is made in Step S33 as to whether or not the focus can be detected with the uppermost partial sensors. When the camera is in the attitude (2), the uppermost partial sensors are the partial sensors 50a, 50b (corresponding to the uppermost detecting region X1). When the camera is in the attitude (3), the uppermost partial sensors are the partial sensors 50e, 50f (corresponding to the uppermost detecting region X3). In the case of No in Step S33, the focus detecting output (defocusing amount and direction) based on the output from the vertical line image sensors 5c, 5d is used in Step S34. The flow then moves to Step S27 for focusing on the basis of that output.

In the case of Yes in Step S33, the flow moves to Step S32 for determining the difference ΔD (ΔD=|Dy−Dup|) between the focus detecting output Dy based on the output from the vertical line image sensors 5c, 5d and the focus detecting output Dup from the uppermost partial sensors. If the difference ΔD is less than a predetermined value DO, the focus detecting output based on the output from the uppermost partial sensors is employed in Step S35. If the difference ΔD is over the predetermined value DO, the focus detecting output based on the output from the vertical line image sensors 5c, 5d (in this case, extended in the horizontal direction of the subject) is employed in Step S36, and the flow then moves to Step S27.

In the detection of the focus according to the above-described procedure, priority is given to the horizontal line image sensor 50 when the camera is in the horizontal attitude, and priority is given to the vertical line image sensors 5c, 5d when the camera is in the vertical attitude in the same way as in the first embodiment. The same effects as those obtained in the first embodiment can thus be obtained. Particularly, in this embodiment, when the camera is in the vertical attitude, i.e., the attitude in which the horizontal focus detecting regions X1, X2, X3 are vertically extended, the vertical line image sensors 5c, 5d and the uppermost partial sensors have priority for detecting the focus.

Figure 9:
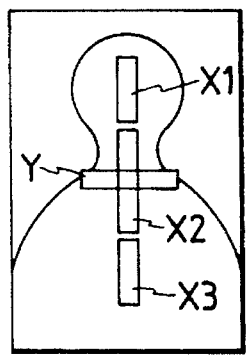

When a person is photographed, for example, by the camera in the vertical attitude, as shown in FIG. 9, the uppermost detecting region (X1 in the case shown in FIG. 9) of the horizontal detecting regions X1, X2, X3 is frequently placed at the position of the face of the subject. The photographic lens can thus be focused on the face of the subject by the uppermost partial sensors given priority. However, when two persons form a line, the uppermost detecting region is placed in the background, and there is thus the possibility of producing a so-called middle blank. The difference ΔD between the focus detecting output Dup based of the output from the uppermost partial sensors and the focus detecting output Dy based on the output from the vertical line image sensors 5c, 5d is thus determined. When the difference ΔD is less than the predetermined value DO, it is decided that the main subject is placed in the uppermost detecting region, and the focus detecting output based on the output from the uppermost partial sensors is employed. When the difference ΔD is greater than the predetermined value DO, it is decided that the main subject is not placed in the uppermost detecting region, and the focus detecting output based on the output from the vertical line image sensors 5c, 5d is employed for driving the lens. It is therefore possible to surely focus on the main subject.

Although, in this embodiment, the horizontal line image sensor is divided into a plurality portions, the vertical line image sensor may be divided. Also, while the above embodiments concern the case in which the focus is detected on the basis of the subject light passed through the photographic lens, the focus may be detected by receiving the subject light without passing through the photographic lens. In addition, the horizontal and vertical focus detecting regions need not be arranged in a cross form, but may be separated from each other. Further, although the above embodiments concern the case where priority is given to the line image sensors corresponding to the focus detecting region extended in the horizontal direction of the subject, priority may be given to the line image sensors corresponding to the focus detecting region extended in the vertical direction of the subject. Of course, attitude detecting devices for the camera are not limited to the mercury switches SW1, SW2.

In the present invention, in a camera having horizontal and vertical focus detecting photoelectric conversion elements, the direction of the photoelectric conversion elements given priority, i.e., the detecting region given priority, with respect to the subject remains unchanged regardless of the attitude of the camera. It is thus possible to effect focusing of the photographic lens without undue delay even if the attitude with respect to the subject is changed.

What is claimed is:

1. An autofocus camera comprising:
   a first photoelectric conversion unit to receive subject light from a detecting region extended in one direction of a photographic image plane and to perform photoelectric conversion;
   a second photoelectric conversion unit to receive subject light from a detecting region extended in a direction different from said one direction of said photographic image plane and to perform photoelectric conversion;
   an attitude detector to detect attitude of the camera;
   a focus detector which selects one of said first and second photoelectric conversion units corresponding to a predetermined priority direction in the detected attitude of the camera and which conducts a focus detection operation using the selected photoelectric conversion unit, said focus detector discriminating based on a result of said focus detection operation whether focus can be detected using the selected photoelectric conversion unit, and, if it is discriminated that focus cannot be detected using the selected photoelectric conversion unit, conducting a focus detection operation using the other of said first and second photoelectric conversion units, said focus detector further providing a focus detection result to be used for focus control; and
   a lens driving unit to drive and focus a photographic lens in accordance with the focus detection result from said focus detector.

2. An autofocus camera according to claim 1, wherein said first photoelectric conversion unit is horizontally oriented and said second photoelectric conversion unit is vertically oriented when the camera is in a horizontal attitude.

3. An autofocus camera according to claim 2, wherein said first photoelectric conversion unit is divided into a plurality of detection regions, said predetermined priority direction is horizontal, and said focus detector has an operating mode in which, when the camera attitude is such that said first photoelectric conversion unit is vertically oriented, said focus detector conducts a focus detection operation with the uppermost of said plurality of detection regions and controls said lens driving unit giving priority to said uppermost region over said second photoelectric conversion unit.

4. An autofocus camera according to claim 3, wherein, in said operating mode, said focus detector calculates a difference between a focus detection output obtained using said second photoelectric conversion unit and a focus detection output obtained using said uppermost detection region, and controls said lens driving unit in accordance with the focus detection output corresponding to said uppermost detection region when said difference is less than a predetermined value and in accordance with the focus detection output of said second photoelectric conversion unit when said difference is greater than said predetermined value.

5. An autofocus camera according to claim 1, wherein said focus detector outputs a focus impossibility indication when focus cannot be detected using said first photoelectric conversion unit and cannot be detected using said second photoelectric conversion unit.

6. An autofocus camera comprising:
   a first photoelectric conversion unit including a plurality of elements to receive subject light from detecting regions which extend along one direction of a photographing image plane and to perform photoelectric conversion;
   a second photoelectric conversion unit to receive subject light from at least one detecting region extending along a direction different from said one direction of said photographing image plane and to perform photoelectric conversion;
   an attitude detector to detect attitude of the camera;
   a focus detector having a first mode of operation in which outputs of all of said light-receiving elements of said first photoelectric conversion units can be utilized for obtaining a focus detection result to be used for focus control, and a second mode of operation in which outputs of only part of said light-receiving elements of said first photoelectric conversion unit can be utilized for obtaining the focus detection result;
   a selector to select between said first and second modes of operation in accordance with the detected attitude of the camera; and
   a lens driving unit to drive and focus a photographic lens according to the focus detection result obtained by said focus detector.

7. An autofocus camera according to claim 6, wherein said first photoelectric conversion unit is horizontally oriented and said second photoelectric conversion unit is vertically oriented when the camera is in a horizontal attitude.

8. An autofocus camera according to claim 1, wherein at least one of said first and second photoelectric conversion units includes a plurality of light-receiving elements, and wherein said focus detector has a first mode of operation in which outputs of all of said light-receiving elements can be utilized for obtaining said focus detection result when said attitude detector detects a first camera attitude, and a second mode of operation in which outputs of only part of said light-receiving elements can be utilized for obtaining said focus detection result when said attitude detector detects a second camera attitude.

9. An autofocus camera according to claim 6, wherein said second photoelectric conversion unit includes a plurality of light-receiving elements, and outputs of at least part of the light-receiving elements of said second photoelectric conversion unit can be utilized for obtaining the photodetection result in each of said first and second modes of operation.

10. A method of detecting focus in an autofocus camera, comprising the steps of:

detecting attitude of the camera;

selecting one of a first photoelectric conversion unit and a second photoelectric conversion unit in accordance with a detected attitude of the camera, said first photoelectric conversion unit receiving subject light from a detecting region extended in one direction of a photographic image plane and performing photoelectric conversion, and said second photoelectric conversion unit receiving subject light from a detecting region extended in a direction different from said one direction of said photographic image plane and performing photoelectric conversion;

conducting a first focus detection operation using the selected photoelectric conversion unit;

discriminating based on a result of the focus detection operation whether focus can be detected using the selected photoelectric conversion unit, and, if it is discriminated that focus cannot be detected using the selected photoelectric conversion unit, conducting a second focus detection operation using the other of said first and second photoelectric conversion units; and driving and focusing a photographic lens in accordance with a focus detection result from the first focus detection operation or the second focus detection operation depending upon whether or not the second focus detection operation is conducted.

11. A method of detecting focus in an autofocus camera, comprising the steps of:

detecting attitude of the camera;

if a first camera attitude is detected, conducting a focus detection operation using outputs of all light-receiving elements of a plurality of light-receiving elements receiving subject light from detecting regions extended in one direction of a photographic image plane to obtain a focus detection result to be used for focus control;

if a second camera attitude is detected, conducting a focus detection operation using only part of said light-receiving elements to obtain the focus detection result; and driving and focusing a photographic lens in accordance with the focus detection result.

* * * * *